United States Patent [19]
Klancnik

[11] 3,809,257
[45] May 7, 1974

[54] MACHINE TOOL FEED APPARATUS

[76] Inventor: Adolph V. Klancnik, 1020 Glenview Rd., Glenview, Ill. 62223

[22] Filed: Aug. 6, 1971

[21] Appl. No.: 169,738

[52] U.S. Cl. ......... 214/8.5 C, 214/1 BB, 214/8.5 F, 408/68
[51] Int. Cl. ............................................ B65g 59/06
[58] Field of Search ........... 214/8.5 F, 8.5 A, 8.5 C, 214/8.5 K, 8.5 R, 1 BB, 1.4, 27; 73/359; 408/67, 68

[56] References Cited
UNITED STATES PATENTS

| 3,650,414 | 3/1972 | Asada | 214/1.5 X |
| 3,390,578 | 7/1968 | Moore | 73/359 |
| 3,134,620 | 5/1964 | Blaisdell | 294/93 X |
| 3,473,676 | 10/1969 | Cotney | 214/8.5 R |

Primary Examiner—Robert J. Spar
Assistant Examiner—George F. Abraham
Attorney, Agent, or Firm—James B. Kinzer; Thomas E. Dorn

[57] ABSTRACT

Work piece transfer apparatus includes a shuttle device which clamps and moves a work piece from a loading station to a work station where the work piece is to be machined, and returns to the loading station. During return movement, the force of the clamp is released and the machined work piece is stripped from the clamp so that the shuttle device returned to the loading station may be reloaded and recycled.

Preferably, the clamp is a collet actuated by an air-operated draw bar, and is supported by a reciprocal shuttle in the form of a mandrel which houses the draw bar. The mandrel and draw bar are operated by independent cylinders.

7 Claims, 6 Drawing Figures

INVENTOR
ADOLPH V. KLANCNIK

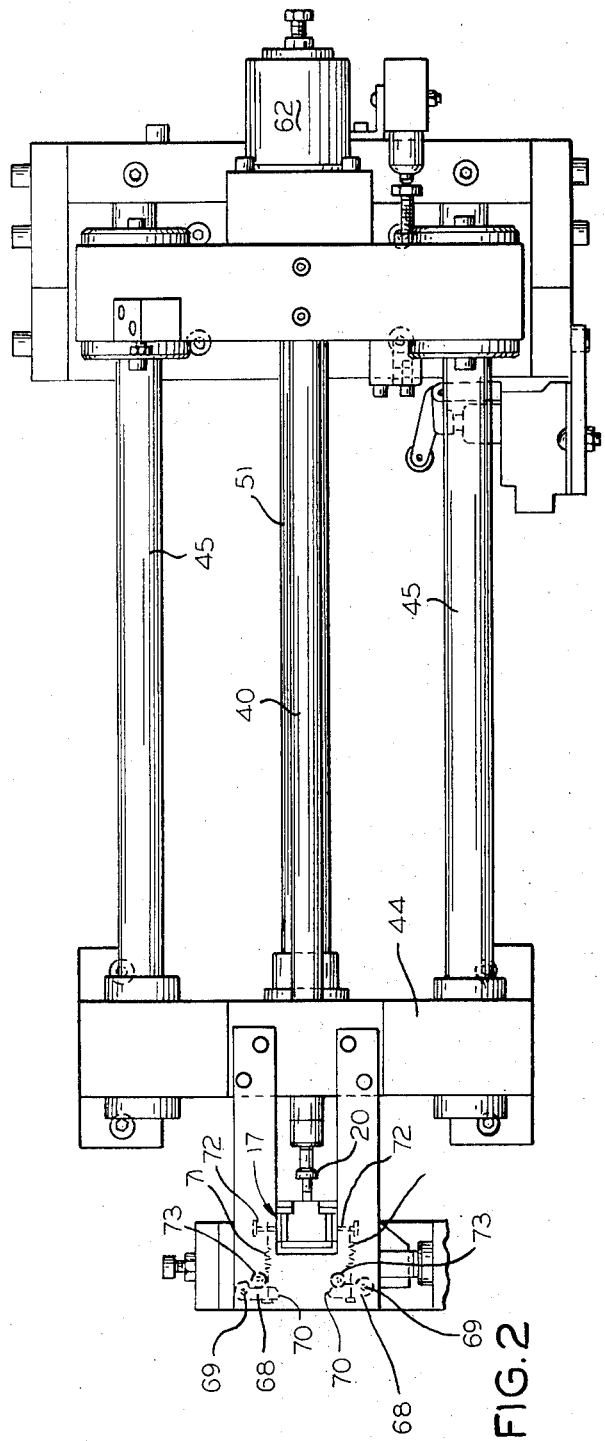
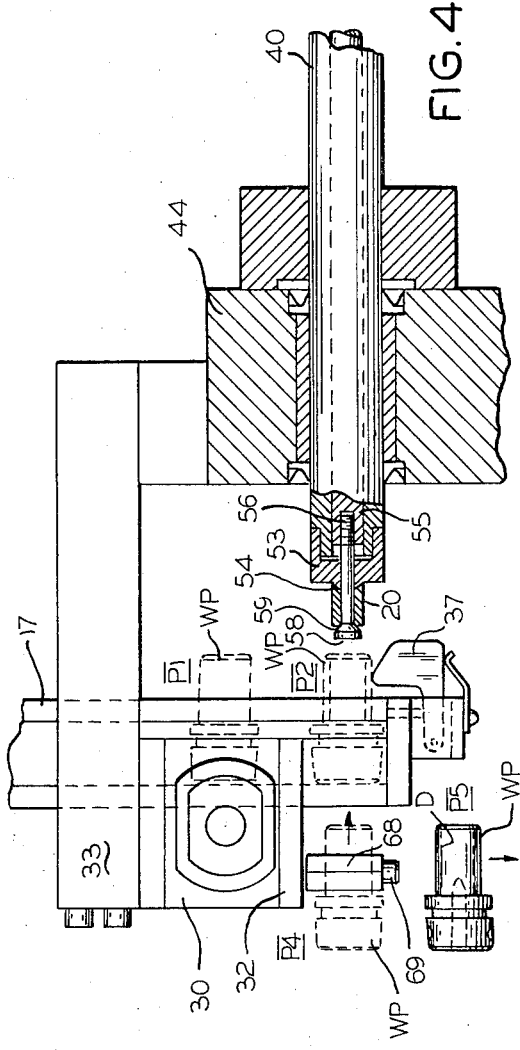
INVENTOR
ADOLPH V. KLANCNIK

INVENTOR
ADOLPH V. KLANCNIK

BY
Kinzer, Dorn and Zickert
ATTORNEYS

3,809,257

MACHINE TOOL FEED APPARATUS

This invention relates to apparatus for moving a work piece from a loading station to a work station where the work piece is to be machined. The term "machined" is used in the broad sense of any modification of the work piece, regardless of the degree of simplicity.

Among the objects of the present invention are to firmly grip the work piece in a clamp at a loading station and to move the clamp bearing the work piece to the work station where the machining operation is performed while the work piece remains firmly gripped; and after the part has been machined, to retract the clamp, release the clamp and strip the work piece from the clamp prior to presenting the clamp to the next work piece at the work station for a repeat cycle. Other objects are to support the clamp on a shuttle located remotely from both the work station and the loading station so that there will be little interference with feeding, transfer and locating, in fact to be able to observe and monitor the capture of a work piece by the clamp, the machining thereof, discharge of the finished part and final return of the clamp device to the work station at the end of a cycle. Other objects are to capture the work piece on a collet as a very effective form of clamp or holding device, to construct the shuttle in the form of a tube or hollow mandrel which both presents the collet and houses a draw bar for actuating the collet, to operate the draw bar by an air cylinder and to operate the shuttle with another air cylinder.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawing:

FIG. 2 is a view similar to FIG. 1 on a larger scale, omitting the machine tool;

Figure 3:
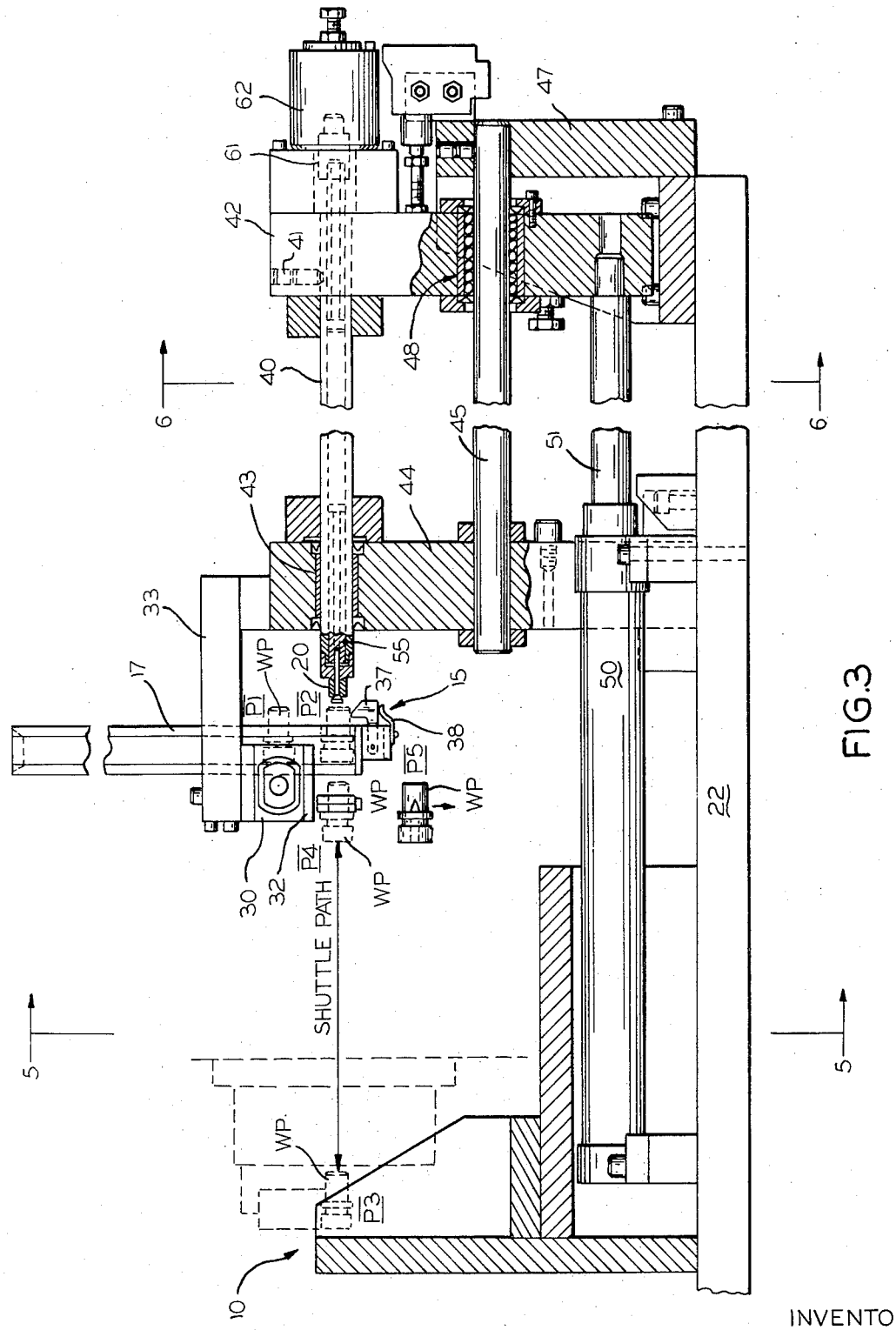
FIG. 3 is a side elevation, partly in section, of the apparatus shown in FIG. 1.
Figure 6:
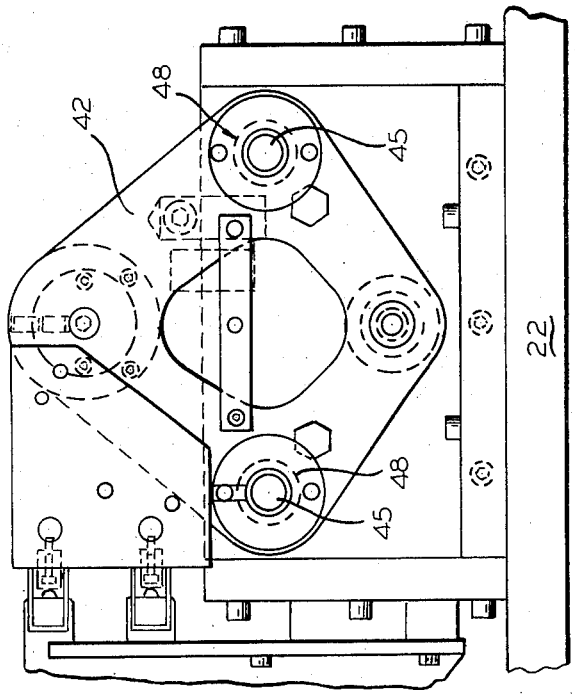
Figure 5:
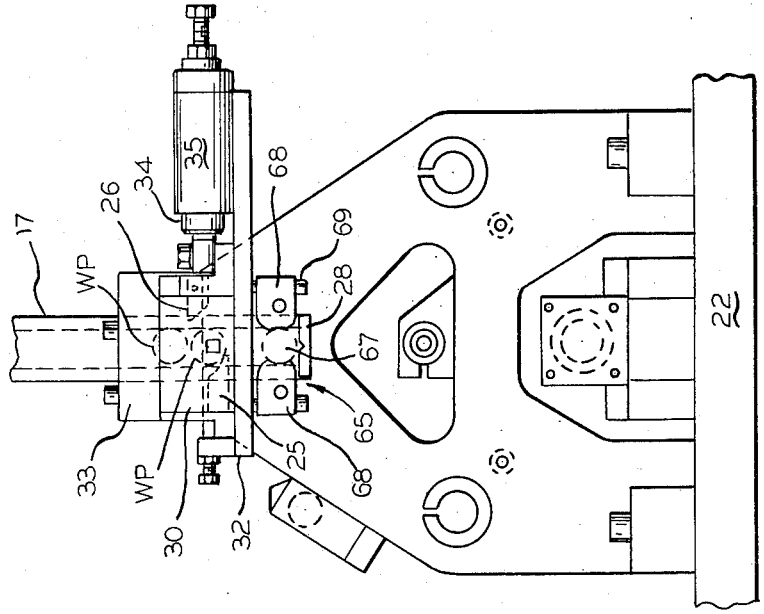

FIG. 4 is a fragmentary elevation, partly in section, of the structure shown in FIG. 3, on an enlarged scale; and FIGS. 5 and 6 are elevations on the lines 5—5 and 6—6 of FIG. 3.

Figure 1:
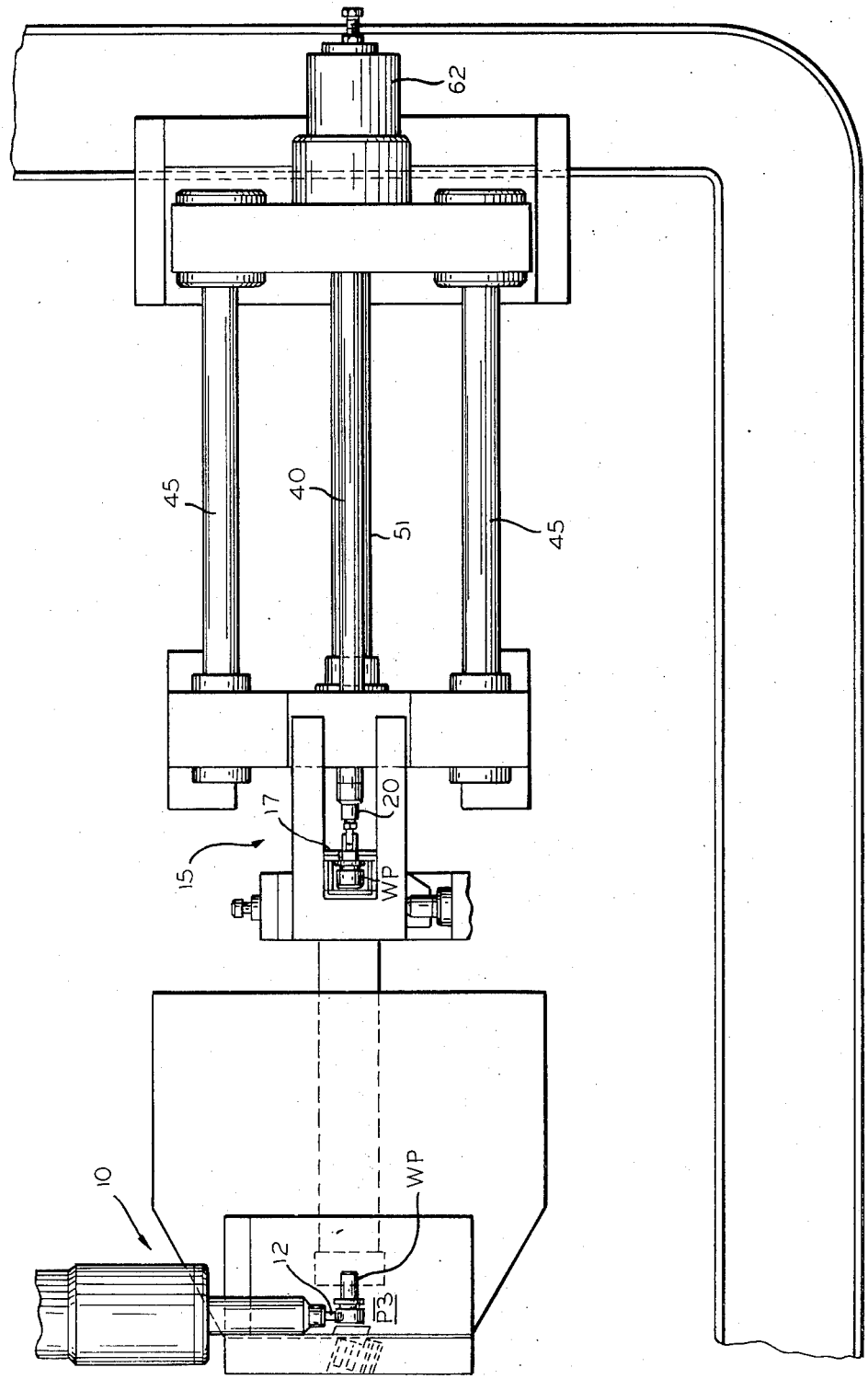
FIG. 1 is a plan view of apparatus constructed in accordance with the present invention, also showing a part of the machine tool per se.

The apparatus of the present invention, FIG. 1, is adapted to present a work piece WP in position P3 to a work station 10 which in the present instance is represented by a front drill 11 and a side drill 12. The specific machining operation performed at the work station 10, for purposes of disclosure, happens to be front and side boring of the work piece WP which itself is to be one of the chuck elements of a hand tool. The manner in which the drills 11 and 12, FIG. 1, are sequenced and presented to the work piece at position P3 constitutes no part of the present invention. To the contrary, the present invention is concerned with movement of the work piece to the work station 10 from a loading station 15, and in this connection the functional aspects of the present apparatus may be briefly stated by reference to FIG. 3 which shows the sequence of movement.

Referring to FIG. 3, a supply of work pieces is contained in a vertically disposed hopper or magazine 17. The lowermost work piece WP in the magazine occupies position P1. As disclosed hereinafter, the work piece at position P1 is allowed to move by gravity fall to position P2. At position P2, the work piece is loaded on a shuttle device, more specifically one which includes a clamp in the form of a collet 20 as described in more detail hereinafter. The collet is tightened internally on the work piece at position P2 and the shuttle is then effective to transfer the work piece from position P2 to position P3 at the work station 10 where the part is machined while being firmly gripped by the collet 20.

The path of the shuttle is indicated by the corresponding legend and double ended arrow line in FIG. 3, which is to say that after the work piece has been machined the shuttle supporting the collet 20 is returned in the direction of home position represented by the loading station. In the course of this return movement the collet is collapsed and the finished work piece is stripped therefrom at position P4, dropping by gravity through position P5 into a collecting bin thereneath. The collecting bin is not identified in FIG. 3 and in fact may only be a pan area located on the top side of the bed 22, FIG. 3, which serves as the main support for the parts hereinafter identified.

The apparatus operates cyclically. A cycle of operation may be defined as commencing with the collet entering the aperture of a work piece at position P2, FIG. 3, transfer of the work piece to the work station, retraction of the shuttle, stripping of the finished work piece, return of the collet to the loading station at position P2 for reloading, and finally feeding of the next work piece from magazine position P1 to loading position P2 which characterize the end of a cycle.

WORK PIECE FEED

Referring to FIG. 5, the work pieces WP are stacked one on top another within the magazine 17, being fed from a main supply afforded by a vibratory hopper, not shown.

The work piece WP, FIG. 5, at position P2 attained this position by gravity fall from position P1. In accordance with the present invention, incremental movement of a work piece from position P1 to P2, and into position P1 itself, is controlled by a pair of feed control fingers or tines 25 and 26. The work piece at position P1 reposes on finger 25. By withdrawing finger 25, the work piece at position P1 will fall by gravity to position P2 in the direction of the bottom plate 28 of the magazine 17.

The feed fingers 25 and 26 are supported by a shuttle plate 30 disposed for reciprocal movement between a pair of vertically spaced guide plates 32 and 33. Reciprocal motion is imparted to the shuttle plate 30 by a piston 34 associated with a double acting, air operated cylinder 35. Thus when air under pressure is admitted to the right hand end of cylinder 35, as viewed in FIG. 5, the piston 34 is advanced and the shuttle 30 is moved leftward, retracting the release finger 25 from the work piece at position P1, and at that time the stop finger 26 is disposed beneath the work piece WP thereabove, blocking downward movement of the latter. On the other hand, when the shuttle is retracted upon movement of the piston 34 in the opposite direction, stop finger 26 is retracted allowing the topmost work piece WP as viewed in FIG. 5 to drop downward into position P1 where its movement is halted by the return of release finger 25 back to position P1.

Referring to FIG. 3, a damper finger 37 is located at the bottom of the magazine and is resiliently supported by a leaf spring 38 in position to receive the work piece falling from position P1 to position P2. By this arrangement, bounce is eliminated from the work piece moving to position P2, and it will also be appreciated that the resilient stop 37 may be adjusted to accurately locate the axis of the work piece relative to the axis of collet 20.

THE WORK PIECE CLAMP (COLLET) AND SHUTTLE

The collet 20, FIG. 3, as noted above, is used to clamp a work piece, internally in this instance, incidental to transferring the work piece from the loading station, postiion P2, to the working station, P3. The collet 20 is carried by a shuttle, more specifically a hollow tube or mandrel 40. The right hand end of the mandrel 40 as viewed in FIG. 3 is fastened, as by a set screw 41, to a carriage or slide 42. The mandrel 40, intermediate its length, slides in a bearing 43 presented by a post 44 which in turn is rigidly secured at its lower end to the main bed 22 of the apparatus.

The carriage 42 is supported and guided by a pair of large, laterally spaced guide rods 45, FIG. 6. As shown in FIG. 3 each guide rod at one end is supported by the post 44 and at the opposite end by a similar post 47. Conventional bearing structure 48, FIG. 3, is presented between the carriage 42 and the guide rods 45, serving further to steady the carriage 42 and assure smooth movement thereof.

Extending longitudinally of the apparatus, parallel to the bed 22 and supported thereabove, is an air cylinder 50 having a piston 51 associated therewith. The piston 51 is connected to the lower end of the carriage 42. In FIG. 3, the carriage 42, the mandrel 40 and the collet clamp 20 are shown in the retracted position at the commencement of a cycle, ready for an advance stroke to present the collet 20 to the internal aperture of the work piece WP at position P2. To institute the advance stroke of the shuttle, air under pressure is introduced to cylinder 50 to retract or withdraw piston 51. Conversely, air under pressure is reversed in cylinder 50 as an incident to retracting the collet 20 from its most advanced position, P3, in which instance the carriage 42 will be moving in a right hand direction along the guides 45, as viewed in FIG. 3.

Referring to FIG. 4, a collar 53 is secured to the free or left hand end of the mandrel 40. The outer face of the collar 53 has a circular, wedge-shaped shoulder 54 thereon disposed freely at the right hand end of the collet 20. A draw bar 54 for actuating the collet is mounted loosely for reciprocal movement within the bore of the mandrel 40. A collet actuator shaft 56 is threadedly mounted to the left hand of the draw bar as viewed in FIG. 4. The collet actuator shaft 56 extends through collar 53, through collet 20 and terminates in a head 58 having a wedge-shaped shoulder 59 which is inclined opposite the shoulder 54 of the mandrel collar 53.

Thus, it will be seen that the collet in effect is captured betweeen the two wedging surfaces 54 and 59. Upon retraction of the draw bar 55, in a right hand direction as viewed in FIG. 4, the wedges 54 and 59 are effective to expand the collet, and this will take place after the collet 20 has been entered in the work piece as disclosed further hereinafter.

The draw bar extends entirely through the mandrel 40, as will be evident in FIG. 3, and at the end thereof opposite the collet 20 the draw bar is secured to the piston 61 of an air operated cylinder 62. Cylinder 62 is supported on the carriage 42 so as to move therewith.

CAPTURE OF THE WORK PIECE AND MOVEMENT OF THE SHUTTLE

Referring to FIG. 4, each work piece (position P5) has a relatively large internal bore or diameter D. The collet 20 is configured to fit neatly therein. At the commencement of a cycle, a work piece at position P2 is reposing on the rest finger 37. Air for retracting the loading piston 51, FIG. 3, is admitted to cylinder 50 which moves carriage 42 leftward, positioning the collet 20 within the aperture of the work piece at position P2. A pair of coil springs, not shown, exert a small amount of tension on the work piece at position P2, just sufficient to steady the work piece as the collet moves into the aperture D thereof.

Thus the work piece at position P2 is captured and continued movement of the shuttle structure, supporting the work piece, moves the latter leftward as viewed in FIGS. 2 and 3 through and past a stripper device 65, FIG. 5, presenting an opening 67 centered on the axis of the shuttle. The opening 67 is defined by the lateral spacing between a pair of stripper fingers specifically in the form of one-way dogs 68 pivotally supported by bolts 69 which depend from plate 32.

As shown in FIG. 2, the stripper fingers or dogs 68 have bevelled ends 70 at the side facing the supply magazine 17. The separation between the bevelled faces 70 is less than the outside diameter of the work piece.

The fingers are biased by coil springs 71 anchored at one end to respective pins 72 each at one side of the supply magazine. The opposite ends of the springs are anchored respectively to the stripper fingers so that normally the stripper fingers are urged against stops 73. The stripper device may also be viewed as a gate in that as the front end of the work piece, gripped by the collet, is moved in the direction of the work station 10, the stripper fingers are moved outwardly as the work piece moves therepast, but on the reverse or return stroke, FIG. 4, the stripper fingers are effective to strip the work piece at position P4 from the collet, opened as hereinafter described, and the stripped work piece falls downward through position P5.

The timing of operation is such that after completion of the machining operation at the work station, the shuttle 30 is retracted as an incident to a right hand stroke of piston 51 as viewed in FIG. 3. During the return stroke and prior to the collet 20 attaining position P4, FIG. 3, the draw bar is released by admission of air under pressure to cylinder 62 in such fashion as to shift the collet draw bar 55 to the left, allowing the collet to collapse. Hence when the work piece engages the stripper fingers 68 during reverse or return movement of the shuttle, the work piece is stripped thereby conditioning the collet to capture a new work piece on the next cycle of operation. Finally, as the collet attains the position shown in FIG. 4, the shuttle cylinder 35, FIG. 5, is operated to drop the next work piece into position P2 characterizing the end of the cycle.

I claim:

1. In a machine tool where a work piece is to be transferred from a loading station to a work station for machining by the machine tool, means at the loading station to position the work piece for transfer, a clamp engageable with and effective to grip rigidly the work piece at the loading station for transfer, a shuttle supporting the clamp and effective to present the clamp to the work piece, means to reciprocate the shuttle to move the clamp which grips the work piece along a predetermined path between said stations, means to actuate the clamp when initially presented to and engaged with the work piece at the loading station and to release the clamp subsequent to machining of the work piece, and stripper means in the path of the clamp between said stations for stripping the released work piece from the clamp.

2. Apparatus according to claim 1 in which the stripper means is a one-way dog.

3. Apparatus according to claim 1 in which the clamp is a collet fitting a bore in the work piece, and means to expand and collapse the collet within the bore of the work piece respectively to grip and release the work piece.

4. Apparatus according to claim 3 in which the shuttle is a hollow mandrel presenting the collet at one end thereof, a wedge-shaped shoulder on the mandrel engageable with one end of the collet, a draw bar within the bore of the mandrel, said draw bar having a wedge-shaped collar engageable with the other end of the collet for expanding the collet upon retraction of the draw bar and allowing the collet to collapse upon extension of the draw bar, and a first cylinder and piston for retracting and extending the draw bar.

5. Apparatus according to claim 4 in which the mandrel is supported by a reciprocal carriage, a second cylinder and piston for reciprocating the mandrel carriage, the first cylinder and piston being mounted on said carriage.

6. Apparatus according to claim 5 in which the stripper means is a one-way dog.

7. Apparatus according to claim 6 including a magazine for containing a supply of work pieces for gravity fall to the loading station, feed means for sequencing gravity fall of work pieces from the supply into the loading station, and a resilient support at the loading station for receiving and obviating bounce of a work piece falling into the loading station.

* * * * *